United States Patent
Ortiz et al.

(10) Patent No.: US 7,188,275 B2
(45) Date of Patent: Mar. 6, 2007

(54) METHOD OF VERIFYING A MONITORING AND RESPONSIVE INFRASTRUCTURE OF A SYSTEM

(75) Inventors: Richard D. Ortiz, Roseville, CA (US); Zane P. Westover, Rocklin, CA (US); Roy Tsuchida, Campbell, CA (US); Dick T. Fong, Sacramento, CA (US); Gregory R. Hargis, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 498 days.

(21) Appl. No.: 10/759,362

(22) Filed: Jan. 16, 2004

(65) Prior Publication Data

US 2005/0172176 A1    Aug. 4, 2005

(51) Int. Cl.
*G06F 11/00* (2006.01)
(52) U.S. Cl. .............................. 714/27; 714/28; 714/37; 714/41; 714/47
(58) Field of Classification Search ................... 714/27, 714/28, 37, 41, 47
See application file for complete search history.

(56) References Cited

U.S. PATENT DOCUMENTS

| | | | | |
|---|---|---|---|---|
| 4,224,466 A | * | 9/1980 | Bush et al. | 178/69 G |
| 4,803,683 A | * | 2/1989 | Mori et al. | 714/31 |
| 5,023,791 A | * | 6/1991 | Herzberg et al. | 701/35 |
| 6,798,209 B2 | * | 9/2004 | Lavoie et al. | 324/424 |
| 6,882,963 B1 | * | 4/2005 | Slaight | 702/186 |
| 2002/0120421 A1 | * | 8/2002 | Crawford et al. | 702/122 |
| 2004/0257065 A1 | * | 12/2004 | Wims et al. | 324/158.1 |
| 2005/0137833 A1 | * | 6/2005 | Sistla | 702/188 |
| 2005/0223120 A1 | * | 10/2005 | Scharold et al. | 710/1 |

* cited by examiner

*Primary Examiner*—Robert W. Beausoliel
*Assistant Examiner*—Emerson Puente

(57) ABSTRACT

A method of verifying a monitoring and responsive infrastructure of a system is provided and described. The method includes setting a sensor to a simulation mode. Further, a test value is provided to simulate a real value outputted by the sensor. While in the simulation mode, the test value instead of the real value is sent to the monitoring and responsive infrastructure to invoke a response. Moreover, the response to the test value is verified. In an embodiment, the monitoring and responsive infrastructure is compliant with an Intelligent Platform Management Interface specification.

18 Claims, 4 Drawing Sheets

METHOD OF VERIFYING A MONITORING AND RESPONSIVE INFRASTRUCTURE OF A SYSTEM

BACKGROUND OF THE INVENTION

1. Field of the Invention

The present invention generally relates to testing and verification of a system. More particularly, the present invention relates to verifying a monitoring and responsive infrastructure of a system.

2. Related Art

Monitoring and responding to fluctuations in the physical environment (e.g., temperature, fan speed, voltage levels, etc.) of a system, such as a server, is complex, but essential to maintaining a high level of reliability. As a result, the Intelligent Platform Management Interface (IPMI) specification was developed to define a monitoring and responsive infrastructure for a system, as well as other capabilities. In general, the monitoring and responsive infrastructure compliant with the IPMI specification accumulates information about the system. This information represents system health and system status information. Sensors are utilized to monitor the various system voltages, temperatures, fan speeds, bus errors, power supplies, physical security, etc. The sensors are periodically polled to receive the output of the sensors. Various thresholds (e.g., critical, non-critical, warning, non-recoverable, etc.) and ranges can be set for each sensor to distinguish normal conditions of the system from abnormal conditions. Moreover, events can be defined, whereas an event represents the occurrence of a condition of interest (e.g., triggering a threshold) that necessitates the performance of particular responsive action.

When the event is identified, the corresponding response is invoked. For example, if the temperature of the processor passes a certain warning threshold, the response could be to increase the fan speed, possibly illuminate an appropriate LED (light emitting diode), and properly log the event in a system event log for later examination and diagnosis by support resources.

While the IPMI specification defines the features of the monitoring and responsive infrastructure, the IPMI specification fails to address testing and verification of the monitoring and responsive infrastructure. As a result, testing and verification is manually performed, a task that is time consuming, labor intensive, and sometimes difficult to perform. This requires use of hardware (e.g., temperature guns to increase/decrease temperature at specific locations monitored by sensors, special power supplies to vary the voltages to the voltage rails or the processor, special push buttons to initiate certain actions, etc.) to physically change the physical environment of the system. As described above, the various thresholds can be set for each sensor. However, some of these thresholds are triggered by abnormal conditions that may harm, damage, or destroy the system. In sum, the current manner for testing and verifying the monitoring and responsive infrastructure is costly, time consuming, inefficient, and could jeopardize the health of the system.

SUMMARY OF THE INVENTION

A method of verifying a monitoring and responsive infrastructure of a system is provided and described. The method includes setting a sensor to a simulation mode. Further, a test value is provided to simulate a real value outputted by the sensor. While in the simulation mode, the test value instead of the real value is sent to the monitoring and responsive infrastructure to invoke a response. Moreover, the response to the test value is verified. In an embodiment, the monitoring and responsive infrastructure is compliant with an Intelligent Platform Management Interface specification.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Rather than jeopardizing the health of a system by actually creating the abnormal conditions on the system to be tested, these abnormal conditions are simulated by providing test values that simulate real values outputted by a sensor. While the sensor is operated in the simulated mode, the test value instead of the real value is sent to the monitoring and responsive infrastructure to invoke a response. Thereafter, the response to the test value is verified. This enables automation of the testing and verification of the monitoring and responsive infrastructure. Moreover, the system is not subjected to abnormal conditions that could harm, damage, or destroy the system.

Figure 1:
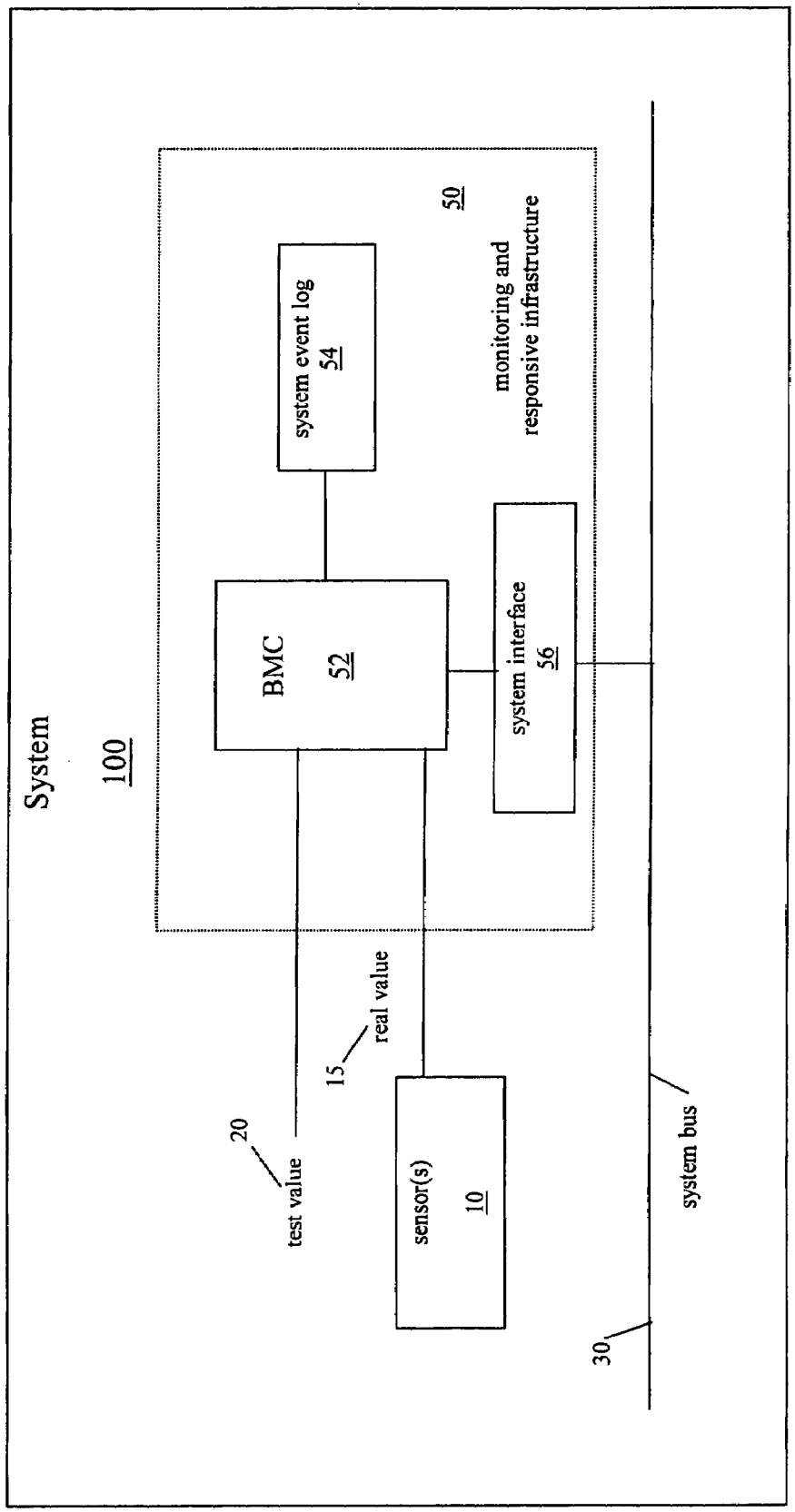
FIG. 1 illustrates a system in accordance with an embodiment of the present invention, showing a monitoring and responsive infrastructure.

FIG. 1 illustrates a system 100 in accordance with an embodiment of the present invention, showing a monitoring and responsive infrastructure 50. As illustrated in FIG. 1, the system 100 includes a monitoring and responsive infrastructure 50, one or more sensors 10, and a system bus 30. In an embodiment, the system 100 is a server.

The monitoring and responsive infrastructure 50 is compliant with an Intelligent Platform Management Interface (IPMI) specification. In an embodiment, the monitoring and responsive infrastructure 50 includes a BMC (Baseboard Management Controller) 52, a system event log 54, and a system interface 56. The monitoring and responsive infrastructure 50 can be implemented as hardware, software, or a combination of software and hardware.

Continuing, the IPMI specification defines a set of commands but allows vendors to introduce new commands for vendor customization through "OEM EXTENTIONS". As a result, the present invention utilizes this "OEM EXTENTIONS" capability to define a new "simulation" command to set sensors 10 to a simulation mode and to provide test values 20 that simulate the real values 15 outputted by the sensors 10. Different test values can be utilized to simulate conditions corresponding to different events. Hence, the test values 20 can be used to simulate events that invoke a response from the monitoring and responsive infrastructure 50 without harming, damaging, or destroying the system 100. Moreover, the new "simulation" command can be used in a sequential manner to test and verify numerous events and numerous sensor output scenarios, leading to savings in time, costs, and manpower hours. Rather than requiring days or weeks to perform the testing and verification, this task can be completed overnight.

Figure 2A:
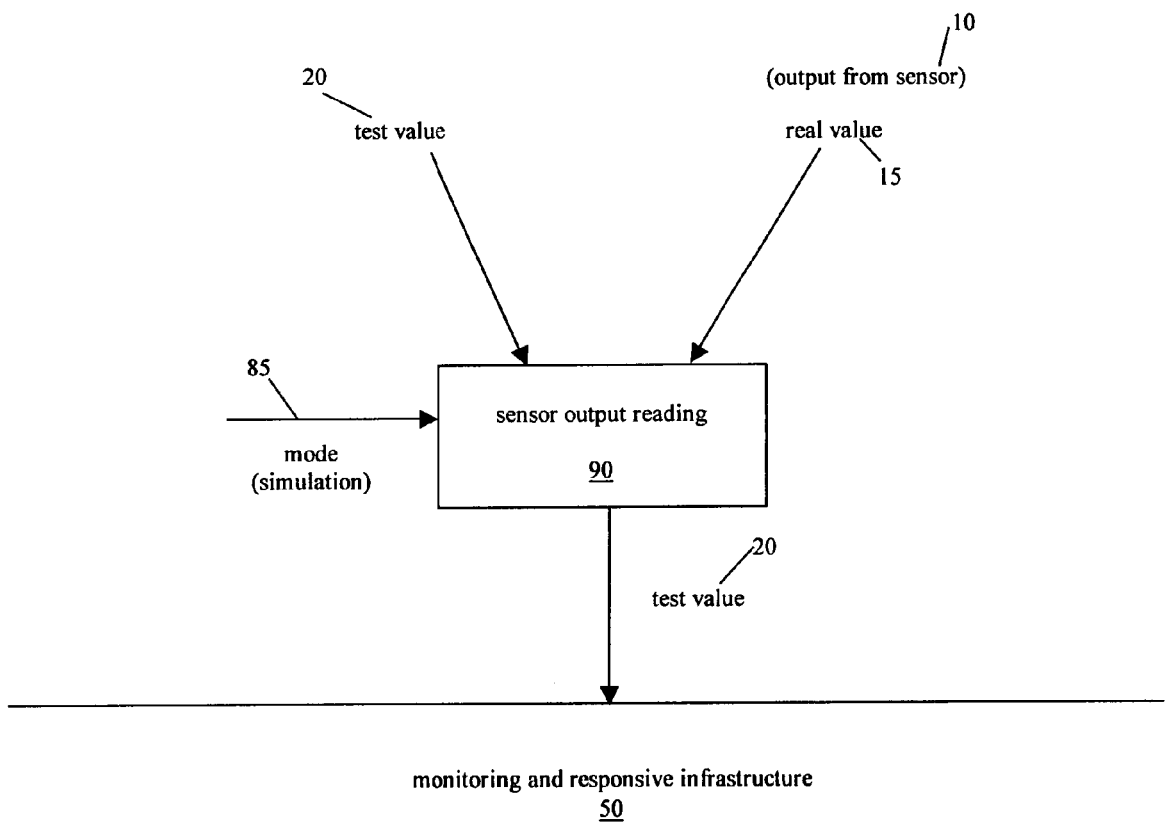
FIG. 2A illustrates a simulation mode in accordance with an embodiment of the present invention.

FIG. 2A illustrates a simulation mode in accordance with an embodiment of the present invention. As shown in FIG. 2A, the sensor output reading 90 sent to the monitoring and responsive infrastructure 50 is determined by the mode 85 (e.g., simulation mode or non-simulation mode) of the sensor 10. Here, the mode 85 is set to simulation mode. Hence, the sensor output reading 90 sent to the monitoring and responsive infrastructure 50 is the test value 20. It should be understood that multiple sensors 10 can be simultaneously operated in the simulation mode.

Figure 2B:
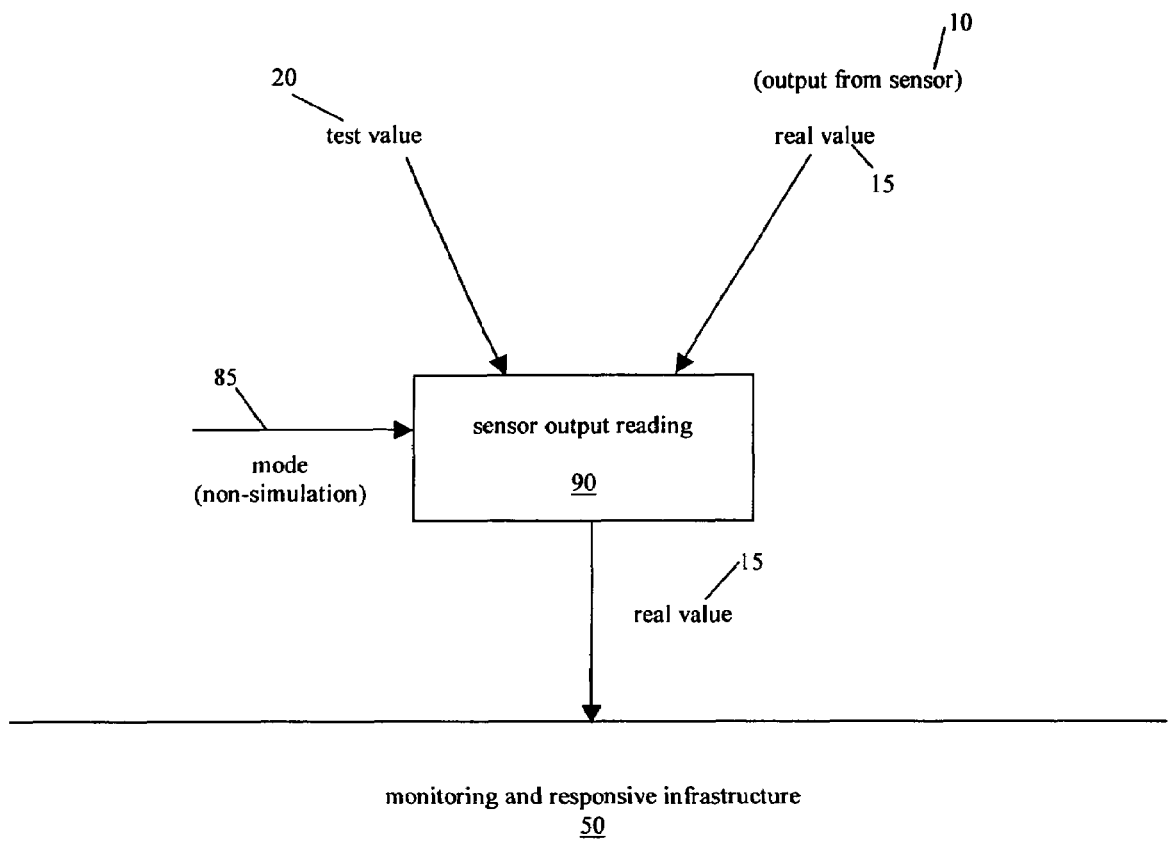
FIG. 2B illustrates a non-simulation mode in accordance with an embodiment of the present invention.

FIG. 2B illustrates a non-simulation mode in accordance with an embodiment of the present invention. As shown in FIG. 2B, the sensor output reading 90 sent to the monitoring and responsive infrastructure 50 is determined by the mode 85 (e.g., simulation mode or non-simulation mode) of the sensor 10. Here, the mode 85 is set to non-simulation mode. Hence, the sensor output reading 90 sent to the monitoring and responsive infrastructure 50 is the real value 15. It should be understood that multiple sensors 10 can be simultaneously operated in the non-simulation mode.

Figure 3:
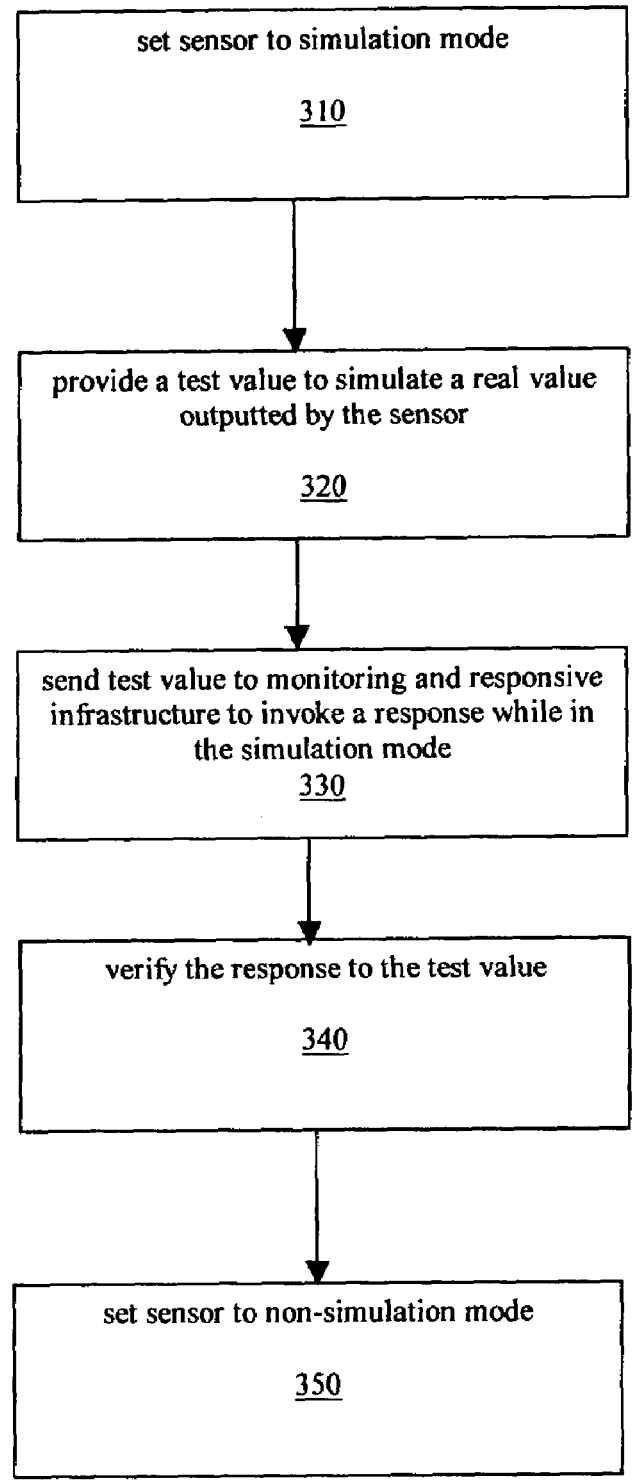
FIG. 3 illustrates a flow chart showing a method of verifying a monitoring and responsive infrastructure of a system in accordance with an embodiment of the present invention.

FIG. 3 illustrates a flow chart showing a method 300 of verifying a monitoring and responsive infrastructure 50 of a system 100 in accordance with an embodiment of the present invention. Reference is made to FIGS. 1–2B. In an embodiment, the default mode for each sensor 10 is the non-simulation mode.

At Step 310, a sensor 10 that is associated with the desired testing and verification of the monitoring and responsive infrastructure 50 is set to a simulation mode. The new "simulation" command described above is utilized. In an embodiment, the new "simulation" command sets a location in a table to a particular value that indicates simulation mode, whereas the location corresponds to the sensor 10.

Continuing, at Step 320, a test value to simulate a real value outputted by the sensor is provided. In an embodiment, the new "simulation" command can be utilized to provide the test value.

Furthermore, at Step 330, while the sensor 10 is in the simulation mode, the test value instead of the real value is sent to the monitoring and responsive infrastructure 50 to invoke a response. As described above, various thresholds can be set for each sensor 10, whereas each threshold can represent a different level or degree of abnormal condition. Some thresholds could range from a warning threshold (or no damage to system yet) up to a fatal threshold (or damage to system).

Depending on the degree or level of threshold encountered a corresponding response can be taken. The IPMI specification defines automatic and manually-driven response capabilities such as local and remote resets, power on/off operations, component adjustments (e.g., increase/decrease fan speed), etc. Moreover, the IPMI specification defines the logging of these abnormal conditions such that they can be examined and later diagnosed by support resources.

Continuing at Step 340, the response to the test value is verified. In an embodiment, it is determined whether the test value triggered the monitoring and responsive infrastructure 50 to properly identify an event, whereas an event represents the occurrence of a condition of interest (e.g., triggering a threshold) that necessitates the performance of particular responsive action.

Additionally, it is determined whether the monitoring and responsive infrastructure 50 performs the appropriate responsive action to the event. The appropriate responsive action can include a recovery action (e.g., local and remote resets, power on/off operations, component adjustments, etc.). Moreover, the responsive action can include illumination of an appropriate LED (light emitting diode).

Moreover, it is determined whether the event is properly logged in the system event log 54 (FIG. 1).

At Step 350, the sensor 10 that is associated with the desired testing and verification of the monitoring and responsive infrastructure 50 is set to a non-simulation mode. The new "simulation" command described above can be utilized. In an embodiment, the new "simulation" command sets a location in a table to a particular value that indicates non-simulation mode, whereas the location corresponds to the sensor 10.

Thus, the present invention provides flexibility and automation in verifying the monitoring and responsive infrastructure 50 of a system 100. Moreover, the testing and verification of the monitoring and responsive infrastructure 50 can be performed before the system 100 is completely assembled since test values can be utilized to simulate the real values outputted by the sensors of uncompleted portions of the system 100.

In an embodiment, the invention is configured as computer-executable instructions stored in a computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of verifying a monitoring and responsive infrastructure of a system, said method comprising:
   setting a sensor to a simulation mode;
   providing a test value to simulate a real value outputted by said sensor;
   while in said simulation mode, sending said test value instead of said real value to said monitoring and responsive infrastructure to invoke a response; and
   verifying said response to said test value, wherein said verifying said response includes:

determining whether identification of an event is triggered;

determining whether appropriate responsive action to said event is performed; and determining whether said event is properly logged in a system event log.

2. The method as recited in claim 1 wherein said monitoring and responsive infrastructure is compliant with an Intelligent Platform Management Interface specification.

3. The method as recited in claim 1 wherein said appropriate responsive action includes a recovery action.

4. The method as recited in claim 1 wherein said appropriate responsive action includes illumination of a LED (light emitting diode).

5. The method as recited in claim 1 wherein said system is a server.

6. The method as recited in claim 1 wherein said setting said sensor to said simulation mode includes:

setting a location in a table corresponding to said sensor to a particular value indicating simulation mode is selected.

7. A computer-readable medium comprising computer-executable instructions stored therein for performing a method of verifying a monitoring and responsive infrastructure of a system, said method comprising setting a sensor to a simulation mode;

providing a test value to simulate a real value outputted by said sensor;

while in said simulation mode, sending said test value instead of said real value to said monitoring and responsive infrastructure to invoke a response; and verifying said response to said test value, wherein said verifying said response includes:

determining whether identification of an event is triggered;

determining whether appropriate responsive action to said event is performed; and determining whether said event is properly logged in a system event log.

8. The computer-readable medium as recited in claim 7 wherein said monitoring and responsive infrastructure is compliant with an Intelligent Platform Management Interface specification.

9. The computer-readable medium as recited in claim 7 wherein said appropriate responsive action includes a recovery action.

10. The computer-readable medium as recited in claim 7 wherein said appropriate responsive action includes illumination of a LED (light emitting diode).

11. The computer-readable medium as recited in claim 7 wherein said system is a server.

12. The computer-readable medium as recited in claim 7 wherein said setting said sensor to said simulation mode includes:

setting a location in a table corresponding to said sensor to a particular value indicating simulation mode is selected.

13. A system comprising:

a monitoring and responsive infrastructure; and a sensor operable in one of a simulation mode and a non-simulation mode, wherein while in said simulation mode a test value instead of a real value is provided to said monitoring and responsive infrastructure to invoke a response to enable verification of said response to said test value, wherein said verification includes:

determining whether identification of an event is triggered;

determining whether appropriate responsive action to said event is performed; and determining whether said event is properly logged in a system event log.

14. The system as recited in claim 13 wherein said monitoring and responsive infrastructure is compliant with an Intelligent Platform Management Interface specification.

15. The system as recited in claim 13 wherein said appropriate responsive action includes a recovery action.

16. The system as recited in claim 13 wherein said appropriate responsive action includes illumination of a LED (light emitting diode).

17. The system as recited in claim 13 wherein said system is a server.

18. The system as recited in claim 13 wherein said simulation mode includes setting a location in a table corresponding to said sensor to a particular value indicating simulation mode is selected.

* * * * *